US012352419B2

(12) United States Patent
Kuenzler

(10) Patent No.: US 12,352,419 B2
(45) Date of Patent: Jul. 8, 2025

(54) ILLUMINATION DEVICE

(71) Applicant: GLP German Light Products GmbH, Karlsbad (DE)

(72) Inventor: Udo Kuenzler, Karlsbad (DE)

(73) Assignee: GLP German Light Products GmbH, Karlsbad (DE)

(*) Notice: Subject to any disclaimer, the term of this patent is extended or adjusted under 35 U.S.C. 154(b) by 0 days.

(21) Appl. No.: 18/473,332

(22) Filed: Sep. 25, 2023

(65) Prior Publication Data

US 2024/0011628 A1 Jan. 11, 2024

Related U.S. Application Data

(63) Continuation of application No. 17/731,379, filed on Apr. 28, 2022, now Pat. No. 11,774,081, which is a
(Continued)

(30) Foreign Application Priority Data

Sep. 29, 2017 (DE) ..................... 20 2017 005 050.1

(51) Int. Cl.

| | |
|---|---|
| ***F21V 23/04*** | (2006.01) |
| ***F21S 10/02*** | (2006.01) |
| ***F21S 10/06*** | (2006.01) |
| ***F21V 21/15*** | (2006.01) |
| ***F21V 21/30*** | (2006.01) |
| ***F21V 23/00*** | (2015.01) |
| ***F21W 121/00*** | (2006.01) |
| ***F21W 131/406*** | (2006.01) |

(Continued)

(52) U.S. Cl.

CPC ........ *F21V 23/0407* (2013.01); *F21S 10/023* (2013.01); *F21S 10/06* (2013.01); *F21V 21/30* (2013.01); *F21V 23/003* (2013.01); *F21V 21/15* (2013.01); *F21W 2121/00* (2013.01); *F21W 2131/406* (2013.01); *F21Y 2105/14* (2016.08); *F21Y 2115/10* (2016.08)

(58) Field of Classification Search

CPC ... F21V 23/0407; F21V 2115/10; F21V 21/30
See application file for complete search history.

(56) References Cited

U.S. PATENT DOCUMENTS 8,901,848 B2 12/2014 Watanabe et al.
2005/0128751 A1 6/2005 Roberge et al.
(Continued)

FOREIGN PATENT DOCUMENTS

DE 202015009240 U1 12/2016

OTHER PUBLICATIONS

Non-Final Office Action dated Feb. 19, 2019 for U.S. Appl. No. 15/920,498.
(Continued)

*Primary Examiner* — Eric T Eide
(74) *Attorney, Agent, or Firm* — Eschweiler & Potashnik, LLC

(57) ABSTRACT

An illumination device includes two illumination sections. The first illumination section includes a plurality of illumination elements that are each configured to emit light in a light spectrum, wherein the light spectrum is variable. The second illumination section includes one or several illumination elements that are each configured to emit light in a fixed light spectrum, wherein the fixed light spectrum is white.

19 Claims, 6 Drawing Sheets

Related U.S. Application Data continuation of application No. 15/920,498, filed on Mar. 14, 2018, now Pat. No. 11,320,130.

(51) Int. Cl.

| | |
|---|---|
| ***F21Y 105/14*** | (2016.01) |
| ***F21Y 115/10*** | (2016.01) |

(56) References Cited

U.S. PATENT DOCUMENTS

| | | | |
|---|---|---|---|
| 2008/0002413 | A1 | 1/2008 | Wang et al. |
| 2008/0062681 | A1 | 3/2008 | Belliveau et al. |
| 2008/0259596 | A1 | 10/2008 | Biebl |
| 2016/0273748 | A1 | 9/2016 | Salm |
| 2016/0305631 | A1 | 10/2016 | Hansen |
| 2016/0323972 | A1 | 11/2016 | Bora et al. |
| 2017/0352605 | A1 | 12/2017 | Bilan et al. |

OTHER PUBLICATIONS

Final Office Action dated Aug. 21, 2019 for U.S. Appl. No. 15/920,498.
Non-Final Office Action dated Aug. 26, 2020 for U.S. Appl. No. 15/920,498.
Final Office Action dated Feb. 19, 2021 for U.S. Appl. No. 15/920,498.
Non-Final Office Action dated Aug. 2, 2021 for U.S. Appl. No. 15/920,498.
Notice of Allowance dated Jan. 3, 2022 for U.S. Appl. No. 15/920,498.
Non-Final Office Action dated Dec. 1, 2022 for U.S. Appl. No. 17/731,379.
Notice of Allowance dated May 22, 2023 for U.S. Appl. No. 17/731,379.

ILLUMINATION DEVICE

CROSS-REFERENCE TO RELATED APPLICATIONS

This application is a Continuation of U.S. application Ser. No. 17/731,379, filed on Apr. 28, 2022, which is a continuation of U.S. application number filed on Mar. 14, 2018, which claims priority from German Utility Model Application No. 20 2017 005 050.1, which was filed on Sep. 29, 2017. The contents of the above-referenced Patent applications are hereby incorporated by reference in their entirety.

FIELD

Embodiments of the present invention relate to an illumination device and to a panel having at least two illumination sections. Some embodiments relate to a stroboscope.

BACKGROUND

A stroboscope is a flash unit emitting light flashes at regular time intervals, whereby, in a dark environment, movements appear chopped as a sequence of still images. The time intervals and the frequency, respectively, can typically be varied in the range between 0.5 and 100 Hz or normally between 1 and 50 Hz. The flash period is in the order of below 5 ms or even less than 1 ms.

According to conventional technology, xenon flash lamps or light emitting diodes (LED) and LED arrays, respectively, are frequently used as light source. Due to the need for high light energy with simultaneously short light pulse, these light sources are particularly well-suited. The need for high light energy is frequently met by the fact that the stroboscope light sources emit white light that consists, in a physical sense, of portions of all wavelengths of the visible spectral range. An equienergy mixture is desired, which is virtually impossible to realize, so that, in a broader sense, white light also means daylight, such as sunlight or norm light having a specific color temperature.

In illumination technology, stroboscopes are frequently used in combination with other illumination fixtures for colored stage lighting. In such illumination devices, either standard illumination means with color screens or colored LEDs, such as RGB LEDs are used. RGB LEDs can be varied in color depending on their control. In that way, RGB LEDs can also emit white light. However, due to their technical characteristics, RGB LEDs do not have the energy density for realizing stroboscope effects. Thus, there is a need for an improved approach.

SUMMARY

According to an embodiment, an illumination device may have: a first illumination section with a plurality of illumination elements that are each configured to emit light in a light spectrum, wherein the light spectrum is variable; a second illumination section with one or several illumination elements that are each configured to emit light in a fixed light spectrum, wherein the fixed light spectrum is white.

According to another embodiment, an illumination panel may have: a first illumination section with a plurality of illumination elements that are each configured to emit light in a light spectrum, wherein the light spectrum is variable; a second illumination section with a plurality of illumination elements that are each configured to emit light with a fixed light spectrum, wherein the fixed light spectrum is white.

Embodiments of the present invention provide an illumination device having a first and a second illumination section. The first illumination section includes a plurality of illumination elements, such as LEDs or RGB LEDs that are configured to emit light in a light spectrum, wherein the light spectrum is variable. The second illumination section includes one or several illumination elements, such as white LEDs or also other illumination elements configured to emit light in a white fixed light spectrum.

According to embodiments, the first illumination section is geometrically divided into two partial sections, such that, according to further embodiments, the second illumination section is arranged between the two partial sections of the first illumination section (e.g. in the center). In other words, this arrangement can be described such that a single tube element, respectively, and tubular illumination element or illumination array for white light (for example a stroboscope) is used, which is framed by two LED fields of variable color. When it is assumed that LEDs are used both for the first and the second illuminations sections, these illumination elements can be arranged in a common panel.

The core idea of this invention is the finding that when using two different types of illumination elements in a common illumination device or in a common panel, the advantages of both types can be combined, such that the illumination device can be used both as stroboscope and (simultaneously) also as colored illumination device. Such a system offers the advantage of high functionality and also the realization of light effects with high light energy. Further, blurring and fading effects can also be realized.

According to embodiments, the illumination device includes a control that is configured to control the first illumination section with at least 20 Hz, at least 30 Hz and/or at least 50 Hz for emitting regular stroboscope light flashes. Stroboscope light means white high-energy light flashes. According to embodiments, this control frequency can be varied between 0.5 Hz and the maximum control frequency. The same control can also be provided for the first illumination section, such that the same can emit regular light flashes of a defined color or also with white light. The two illumination sections can be controlled synchronously or asynchronously, such that the energy density advantageously increases during synchronous control.

As already mentioned above, in an embodiment for the first illumination section, RGB LEDs are used, e.g. at least 1000 RGB LEDs. For the second illumination section, LEDs can be used as well, such as soft LEDs in the order of between 1000 and 500 LEDs. From a thermal point of view, the usage of LEDs is reasonable, since LEDs are very efficient and the high energy density causes few thermal problems due to the high concentrated light energy.

According to embodiments, both the first illumination section and also the second illumination section can be divided into fields that can be controlled separately. For example, it would be possible that the first section comprises 10 fields or 12 fields, while the second illumination section comprises 2 or more (e.g. 12) fields. Here, for example, different colors and different luminosities are possible, such that moving light can be realized as well.

According to further embodiments, the illumination device includes a longitudinal housing into which, for example, rectangular illumination sections, e.g. of a panel, are integrated. The longitudinal housing is limited in its longitudinal extension by two lateral faces. According to a further embodiment, additionally, a longitudinal stand is provided comprising bearing blocks that are also limited in their longitudinal extension by lateral faces. The bearing blocks include pivot joints via which the longitudinal housing is connected to the stand, such that the longitudinal housing is rotatably supported around a longitudinal axis extending parallel to the stand and the longitudinal housing, respectively. According to further embodiments, this rotation for example by up to 180° or 190° can be motor-driven. Here, means for motor-driven pivoting, such as a motor with a toothed belt and/or a gear are provided in one of the bearing blocks.

A further embodiment relates to an illumination panel with the two above-discussed illumination sections.

BRIEF DESCRIPTION OF THE DRAWINGS

Embodiments of the present invention will be detailed subsequently referring to the appended drawings, in which.

DETAILED DESCRIPTION

Before embodiments of the present invention will be discussed below based on accompanying drawings, it should be noted that the same elements and structures are provided with the same reference numbers, such that the description of the same is inter-applicable and inter-exchangeable.

Figure 1A:
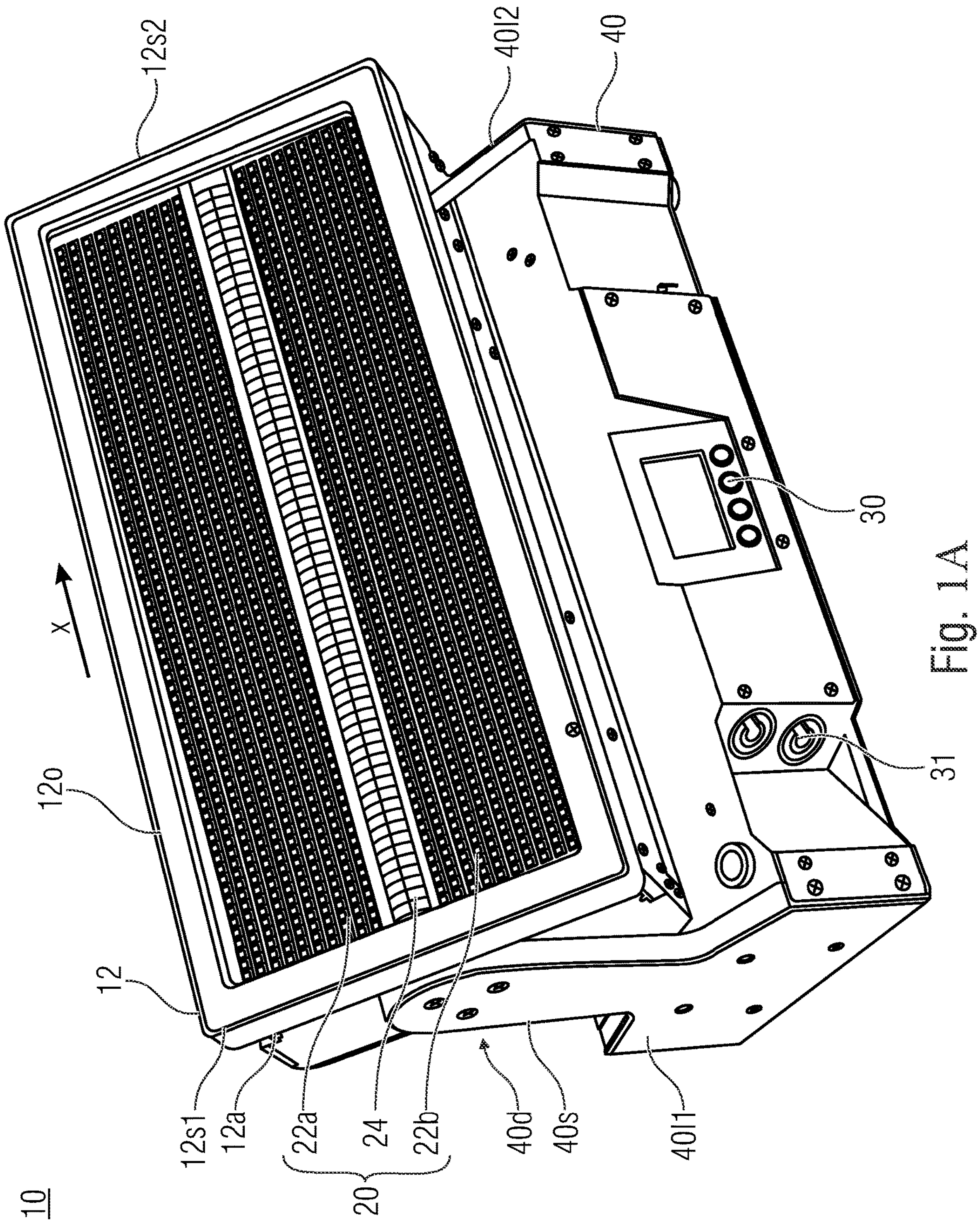
FIGS. 1*a-c* is a schematic illustration of an illumination device according to an embodiment in three different perspective illustrations.
Figure 1B:
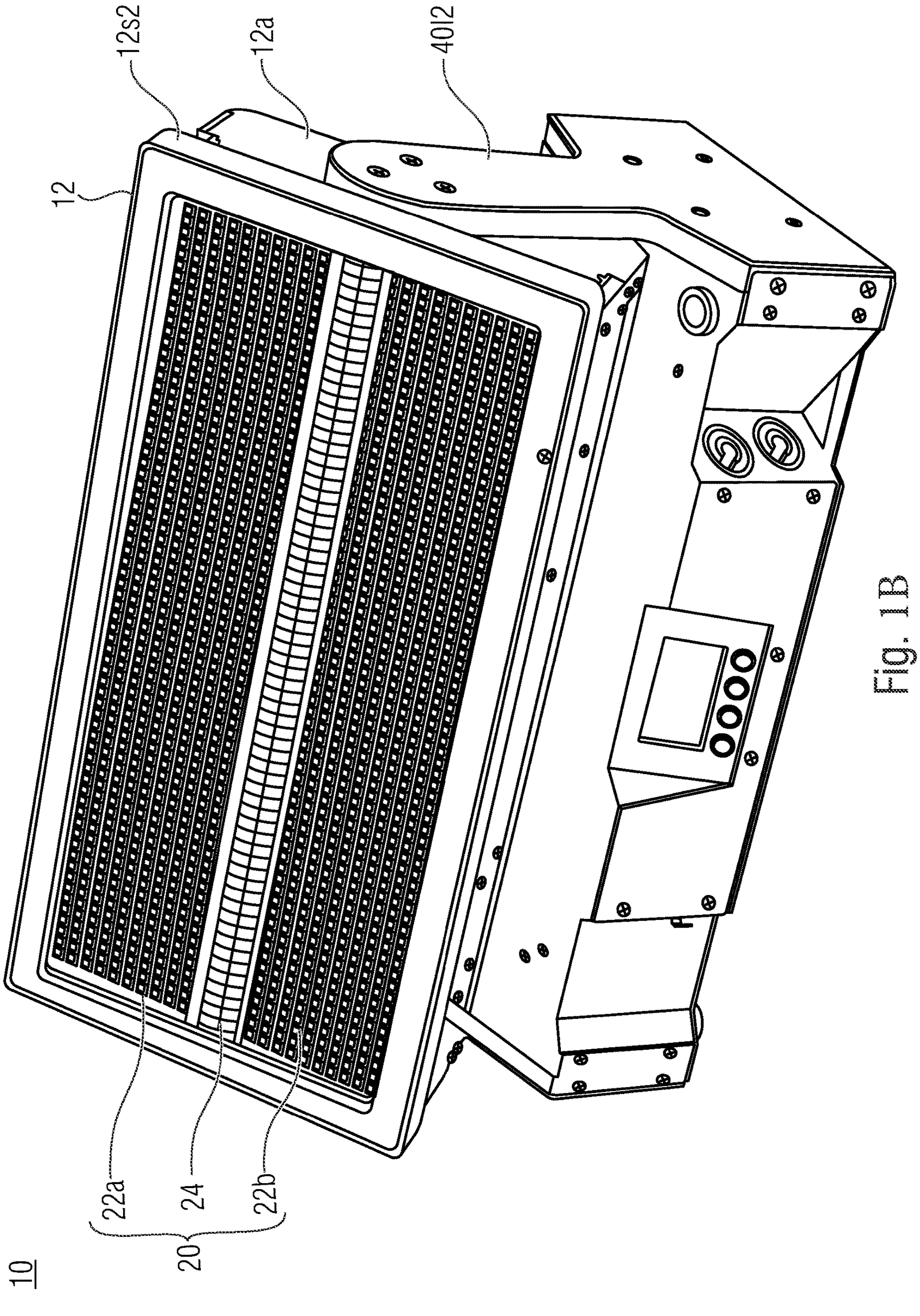
Figure 1C:
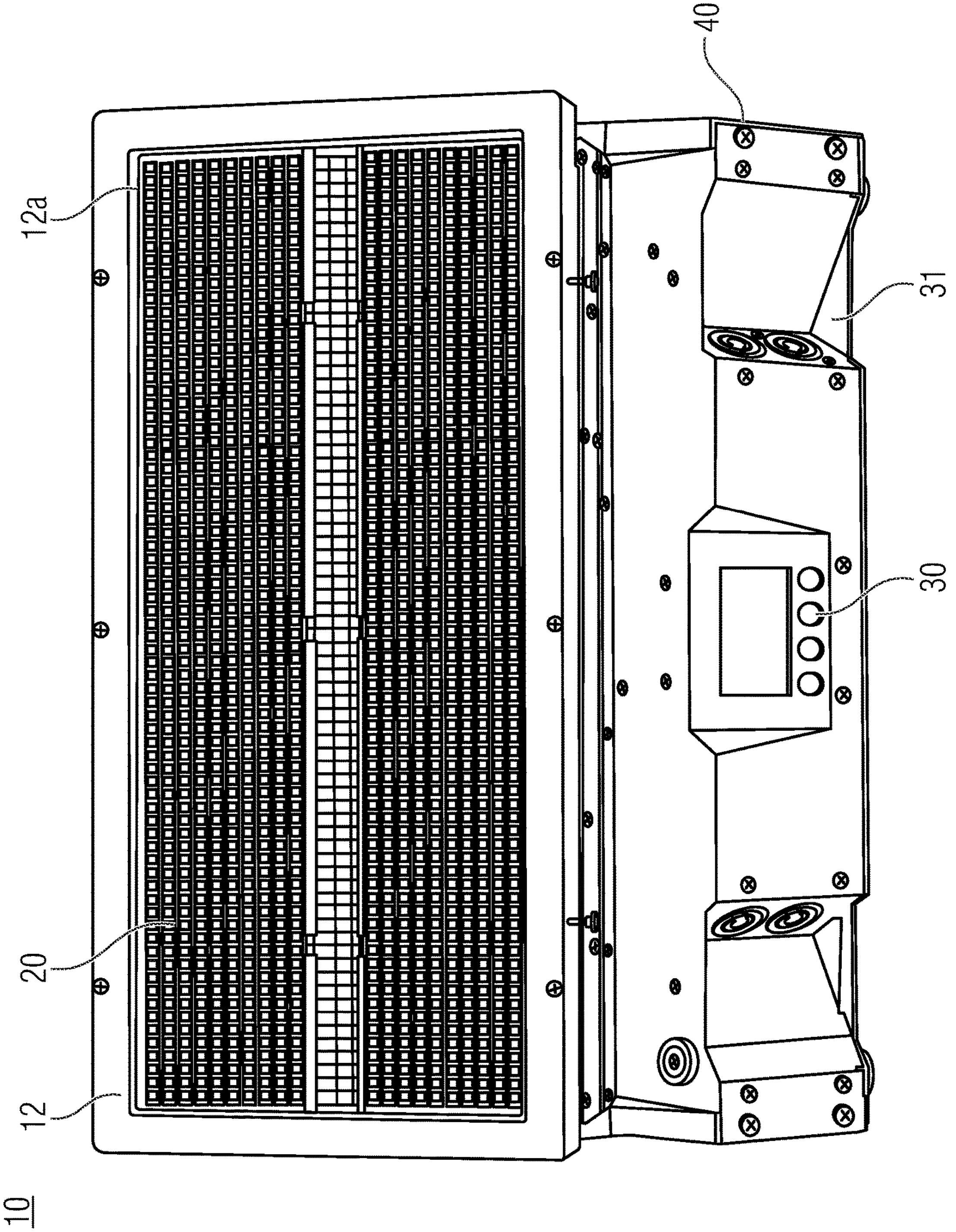

FIG. 1*a* shows a three-dimensional illustration of an illumination device 10 including a longitudinal housing 12 in this embodiment. FIG. 1*b* shows a further three-dimensional view of the same illumination device 10. The longitudinal housing has a rectangular opening 120 in which a panel 20 is inserted. FIG. 1*c* shows the front view of the panel 20 in the housing 12.

The panel 20 includes two illumination sections, namely illumination section 22 and 24. In this embodiment, the illumination section 22 is formed by two partial sections 22*a* and 22*b*. All sections 22*a*, 24 and 22*b* extend longitudinally along the longitudinal illumination device 10 and along the longitudinal housing 12, respectively. As can in particular be seen in FIG. 1*c*, the panel 20 is rectangular and has, for example, an aspect ratio of 2:1 (length to width).

According to embodiments, the three sections 22*a*, 22*b* and 24 are arranged with respect to one another as follows: all three sections 22*a*, 22*b* and 24 extend longitudinally along the longitudinal axis. Here, for example, the two partial sections 22*a* and 22*b* are of approximately the same size. The section 24 is provided between these two partial sections 22*a* and 22*b*. Due to the fact that the two sections are of the same size, a section 24 is centered with respect to the two partial sections 22*a* and 22*b*.

The section 22*a*+22*b* of the panel includes a plurality of illumination elements, here LEDs or in particular RGB LEDs. Generally, these are illumination elements that are variable with respect to their color spectrum. In this embodiment, the second section 24 is also formed by LEDs, but LEDs with a fixed light spectrum, in particular a white light spectrum. With regard to its geometrical arrangement, this second section emulates a fluorescent tube or flash tube, i.e. the same has a high aspect ratio of, for example, 5:1 (length to width). According to further embodiments, in particular this second section can also be formed by a standard fluorescent tube. Both section 22*a*+22*b* and section 24 are formed by a plurality of illumination elements that are repeated both in the longitudinal direction in the respective section as well as in the width direction of the respective section. Section 24 comprises, for example, three or four illumination elements in width and approximately 60 illumination elements in length.

The panel can be provided with a control controlling the three sections 22*a*, 22*b* and 24 accordingly. Here, the control can be implemented such that the RGB LEDs of the sections 22*a* and 22*b* can be varied in color. This control can be implemented independently of section 24. This section can also be adjusted with a specific control frequency, such that flashing effects are possible. The control controls the section 24 advantageously like a stroboscope, i.e. with a repeating frequency in the range of 0.5 to 60 Hz or in particular in the range of 1 to 30 Hz. As already explained above, the emitted light flashes have a very short illumination period but also high illumination intensity. This section illumination section 24 can also be controlled independently of the first illumination section 22*a*+22*b*. According to a further embodiment, a common control would be possible, such that, for example, both by means of the illumination elements of section 22*a* and 22*b* and also by means of the illumination elements of section 24, simultaneous lighting or simultaneous emission of light flashes is possible. The same can also be performed asynchronously, such that color and white stroboscope light flashes are emitted alternately. Thereby, fading effects become possible. By using only LEDs, thermal problems as they typically occur in glass bulb spotlights can be reduced as well.

According to an embodiment, both sections 22*a*, 22*b* and section 24 can be divided into sub-sections, such as 12 sub-sections per partial section, such that individual fields can be controlled separately. In other words, the plurality of illumination elements are grouped per illumination section 22*a*, 22*b* and 24, such that the same are controlled together. This enables moving light effects that can also move beyond the stroboscope range 24 starting from a continuous panel 20.

Here, it should be noted that, according to embodiments, the section 24 normally comprises approximately 100 to 500 LEDs, such as 216 LEDs, while the complete section 22*a*+22*b* normally comprises more than 1000 LEDs, such as 1440 LEDs. The entire panel can receive power, for example, in the order of 1 kW or 1.2 kW and the same can have a lighting efficiency of up to 90% due to the used LED technologies.

Regarding the control it should be noted that the same is controllable via standard protocols, such as DMX-512, ARTNET or RDM. According to embodiments, the illumination device 10 can also include a display with a control. This display is indicated by reference number 30. According to embodiments, the control comprises means for temperature control and in particular for heating control. For remote control of the control, apart from the display a signal connector, such as an XMR-5-Pin connector can be provided (cf. reference number 31).

According to a further embodiment, the longitudinal housing 12 can have a specific shape. As, for example, shown in FIG. 1*a*, the longitudinal extension (cf. x direction) of the housing is limited on the left and right by the two lateral faces 12*s*1 and 12*s*2. Additionally, the illumination device includes a stand 40, comprising, in this embodiment, two bearing blocks at the end of the longitudinal extension. These bearing blocks are indicated by reference numbers 4011 and 4012. The bearing blocks have pivot joints 40*d*, via which the longitudinal illumination housing 12 is rotationally supported with respect to the stand 40. Thereby, the housing 12 and hence the panel 20 and the illumination sections 22*a*, 22*b* and 24, respectively, can be pivoted around a longitudinal axis. This longitudinal axis extends along the longitudinal extension of the longitudinal stand 40 and the longitudinal housing 12 and parallel to the direction x, respectively.

In order that, according to embodiments, the longitudinal extension of the illumination device 10 is defined not by the stand 40 but in particular by the illumination element 12 with its almost full-surface illumination panel 20, the illumination housing 12 includes, both on the side of the lateral face 12*s*1 and on the side of the lateral face 12*s*2, a recess 12*a* in which the bearing blocks 4011 and 4012 are arranged. In the x direction, the recess 12*a* is of a depth that is deeper than or is the same as the thickness of each bearing block 4011 and 4012. This has the effect that the lateral faces 40*s* of the bearing block terminate in a planar manner with the lateral faces 12*s*1 or in an essentially planar manner (i.e. up to 5 mm offset, offset mm). Further, the dimensioning of the recess 12*a* can be designed such that the lateral faces 40*s* of the bearing blocks are recessed with respect to the lateral faces 12*s*1 of the housing 12. This has again the same effect, namely that the longitudinal extension (in x direction) is defined by the housing 12 and not by the stand. It is an advantage of such an arrangement that several illumination elements 10 can be arranged beside one another and can be easily positioned since the same are set up with their front faces adjoined to one another. With regard to the set-up it should be noted that the illumination device 10 can practically be used in any set-up. In that way, a set-up by means of the stand 40 can be implemented and, on the other hand, the stand 40 can also be installed on a traverse or similar support devices.

Generally, concerning the dimensioning of the illumination device, it should be noted that the same has, for example, a length of more than 30 or even 40 cm (for example 390 mm), while the width is in the range of 10 to 20 cm (for example 150 mm). The height is in the range of 20 to 30 cm (e.g. 251 mm).

Figure 2:
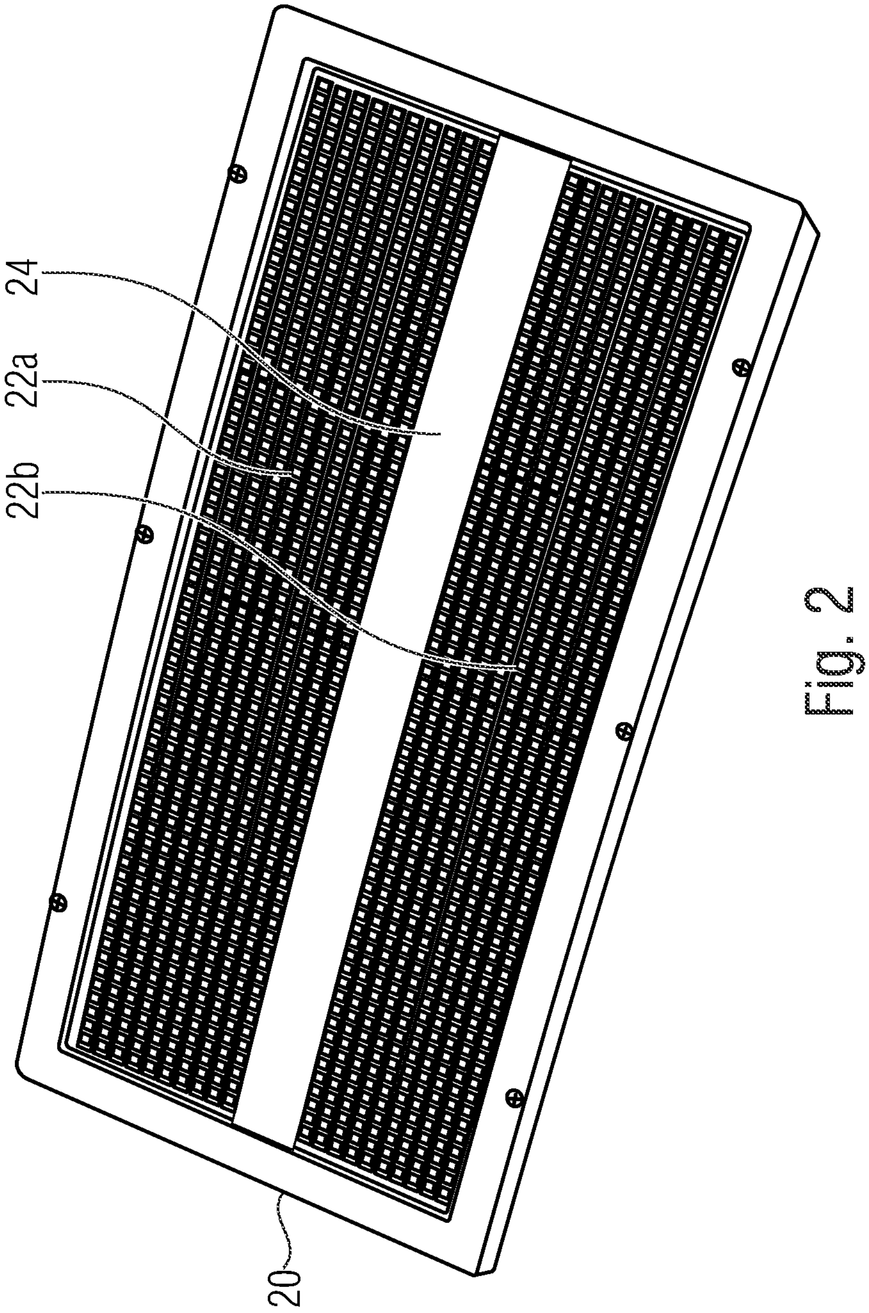
FIG. 2 is a schematic illustration of a panel according to an embodiment.

With reference to FIG. 2, a further embodiment, namely the panel 20 will be discussed. The panel 20 includes a first illumination section formed by two partial sections 22*a* and 22*b* as well as a second illumination section 24. As discussed with reference to FIGS. 1*a-c*, this second illumination section is also provided in a centered manner. The panel includes a plurality of illumination elements that are normally arranged in an equidistant manner, wherein the illumination elements in section 24 are the illumination elements of a type where a fixed (predefined) color spectrum, e.g. a white color spectrum, is emitted, while the illumination elements in the section 22*a* and 22*b* are variable in each color spectrum. The three sections 22*a*, 22*b* and 22*s* are again implemented in a longitudinal manner. According to further embodiments, the arrangement and the longitudinal arrangement, respectively, of the sections 22*a*, 22*b* and 24 can also be implemented differently. Thus, for example, a second section 24 and a third section 22 can be provided, which then alternate accordingly. Instead of the longitudinal orientation of sections 22*a*, 22*b* and 24, vertical orientation would also be possible.

According to a further embodiment, the section 24 can be formed by different elements, such as a standard xenon tube arranged between the sections 22*a* and 22*b*. Alternatively, it would also be possible that this tube is provided behind the first illumination section (undivided illumination section), such that the tube radiates through the first illumination section.

Figure 3A:
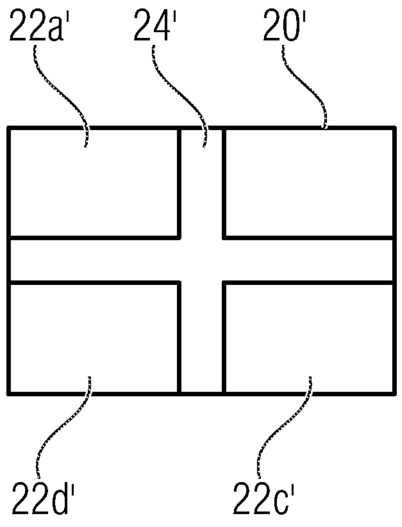
FIGS. 3*a*, 3*b* are schematic illustrations of a rectangular panel according to further embodiments.

FIG. 3*a* shows a rectangular panel 20' with a cross-shaped second illumination section 24' and, starting from this centrally arranged cross-shaped second illumination section 24', four first illumination sections 22*a*' to 221D' (each rectangular) arranged in the corners.

Figure 3B:
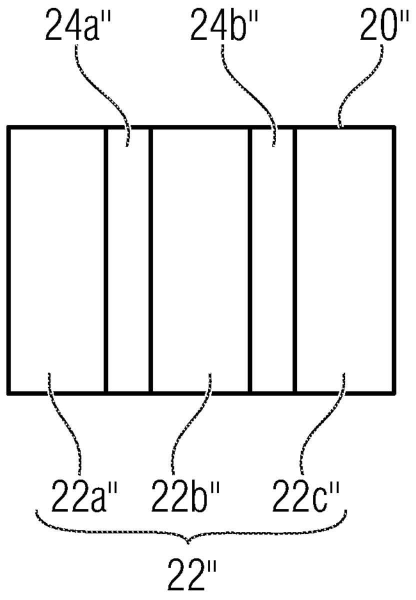

FIG. 3*b* shows a further variation of a rectangular panel 20" with two second illumination sections 24*a*" and 24*h*" that are not arranged longitudinally but transversally to the longitudinal direction such that the first section 22" is divided in three sub-sections.

Figure 4A:
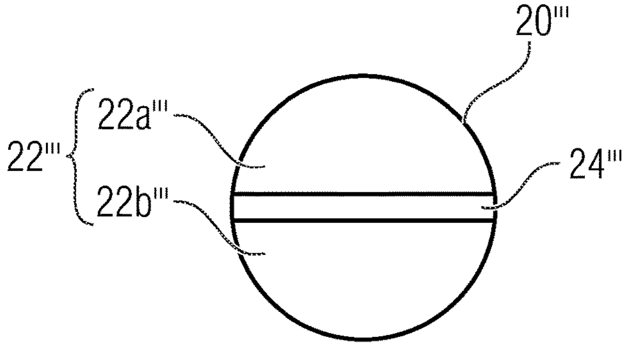
FIGS. 4*a*-4*c* are schematic illustrations of a round panel according to further embodiments.

FIG. 4*a* assumes a rectangular panel 20'", wherein a line-shaped second section 24'" (for example aligned in longitudinal direction) divides the first section 22'" into two crescent-shaped first sections 22*a*'" and 22*b*'".

Figure 4B:
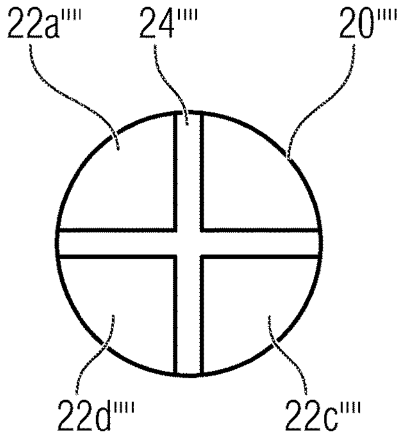

FIG. 4*b* also assumes a round panel 20"", wherein here again a cross-shaped second section 24"" is provided which divides the first section in four circular segment-shaped sections 22*a*"" to 22*b*"".

Figure 4C:
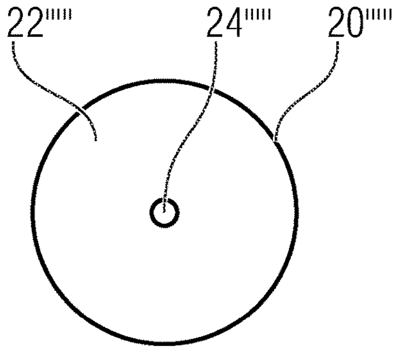

The panel 20""' illustrated in FIG. 4*c* is also implemented as a round panel and includes a centrally arranged point-shaped second section 24""' as well as a first section 22""' extending around the central section 24""'.

All panels 20' to 20""' can be installed in the above-discussed illumination unit and in the above-explained housing, respectively. According to embodiments, the panels 20" and 20" can be configured in a square manner instead of in a rectangular/longitudinal manner, such that the housing is then adapted accordingly. For panels 20'" to 20""', respectively, a corresponding round housing is provided.

In these doubly symmetrical panels 20" to 20""', according to embodiments, the housing mechanics can also be extended, such that biaxial pivoting is provided.

Generally, it should be noted that both the shape of the panels and the sections can vary according to embodiments (e.g. triangular panel, diagonal sections or the same).

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An illumination device, comprising:

a first illumination section comprising a plurality of illumination elements that are each configured to emit light in a light spectrum, wherein the light spectrum is variable;

a second illumination section comprising one or several LED elements that are each configured to emit light in a fixed light spectrum, wherein the fixed light spectrum is white, wherein the illumination device is rectangular, wherein the first illumination section is geometrically divided into two partial sections, wherein the second illumination section extends along an entirety of the illumination device and is arranged between and/or centered between the two partial sections of the first illumination section, and wherein first illumination section emits the light of the variable light spectrum in a first direction and the second illumination section emits the white fixed light spectrum in a second direction, wherein the first direction and the second direction are parallel to each other.

2. The illumination device according to claim 1, wherein the first illumination section and/or the second illumination section is configured to emit the respective light in the form of stroboscope light flashes, such that the illumination device forms a stroboscope, or wherein the first illumination section and/or the second illumination section is configured to emit the respective light in the form of stroboscope light flashes, such that the illumination device forms a stroboscope, wherein the illumination device comprises a control circuit that is configured to control the second illumination section with at least 20 Hz, with at least 30 Hz or at least 50 Hz to emit regular stroboscope light flashes.

3. The illumination device according to claim 2, wherein the control circuit is configured to vary a control frequency between 0.5 Hz and a maximum control frequency, or wherein the control circuit is configured to control the first illumination section with at least 20 Hz in order to emit regular light flashes and/or stroboscope light flashes.

4. The illumination device according to claim 1, further comprising a control circuit is configured to control the first illumination section and the second illumination section in a synchronous manner or in an asynchronous manner.

5. The illumination device according to claim 1, wherein the illumination elements of the first illumination section comprise RGB LEDs.

6. The illumination device according to claim 1, wherein the plurality of illumination elements of the first illumination section are divided into fields that are separately controlled.

7. The illumination device according to claim 6, wherein the first illumination section is divided into at least 10 fields.

8. The illumination device according to claim 1, wherein the second illumination section is formed as a stroboscope tube or in the form of a tube.

9. The illumination device according to claim 1, wherein the second illumination section comprises several white LEDs as illumination elements, or wherein the second illumination section comprises several white LEDs as illumination elements, and wherein the second illumination section comprises more than 100 white LEDs and/or wherein the second illumination section comprises less than 500 white LEDs.

10. The illumination device according to claim 1, wherein the several illumination elements of the second illumination section are divided into at least two fields that are separately controlled.

11. The illumination device according to claim 10, wherein the second illumination section is divided into at least three fields.

12. The illumination device according to claim 1, wherein the illumination device comprises a longitudinal housing that is limited by two lateral faces in a longitudinal extension.

13. The illumination device according to claim 12, wherein the illumination device comprises a longitudinal stand extending parallel to the longitudinal housing; and wherein the longitudinal stand comprises two bearing blocks with rotational joints via which the longitudinal housing is supported in a pivotable manner around a longitudinal axis extending parallel to the longitudinal stand and the longitudinal housing with respect to the longitudinal stand.

14. The illumination device according to claim 13, wherein the longitudinal housing comprises two lateral recesses in which the two bearing blocks are arranged, such that the lateral faces of the longitudinal housing and lateral faces which limit the longitudinal extension of the longitudinal stand with its bearing blocks in the longitudinal extension are terminated in a planar manner with respect to one another, or wherein the lateral faces of the longitudinal stand are recessed with respect to the lateral faces of the longitudinal housing.

15. The illumination device according to claim 13, further comprising a unit configured to provide motor-driven pivoting and/or a motor with a toothed belt in at least one of the bearing blocks.

16. The illumination device according to claim 13, wherein the longitudinal housing is configured to pivot around the longitudinal axis by at least 180°.

17. The illumination device according to claim 1, wherein the illumination device comprises a housing and a stand, wherein the housing is configured to pivot in a biaxial manner or pivot in a biaxial motor-driven manner with respect to the stand.

18. An illumination panel, comprising:

a first illumination section comprising a plurality of illumination elements that are each configured to emit light in a light spectrum, wherein the light spectrum is variable;

a second illumination section comprising a plurality of LED elements that are each configured to emit light with a fixed light spectrum, wherein the fixed light spectrum is white, wherein the first illumination section is geometrically divided into two partial sections, wherein the second illumination section is arranged between and/or centered between the two partial sections of the first illumination section, and wherein first illumination section emits the light of the variable light spectrum in a first direction and the second illumination section emits the light fixed light spectrum in a second direction, wherein the first direction and the second direction are parallel to each other.

19. The illumination panel according to claim 18, wherein the two partial sections and the second illumination section extend in parallel along a longitudinal axis of the illumination panel.

* * * * *